J. E. JOHNSON.
TRANSMISSION FOR AUTOMOBILES.
APPLICATION FILED DEC. 3, 1920.

1,429,882.

Patented Sept. 19, 1922.
3 SHEETS—SHEET 1.

Inventor:
John E. Johnson
By: Albert Chesbh, Atty.

J. E. JOHNSON.
TRANSMISSION FOR AUTOMOBILES.
APPLICATION FILED DEC. 3, 1920.

1,429,882.

Patented Sept. 19, 1922.
3 SHEETS—SHEET 2.

Inventor:
John E. Johnson
By: Albert Scheibl, Atty.

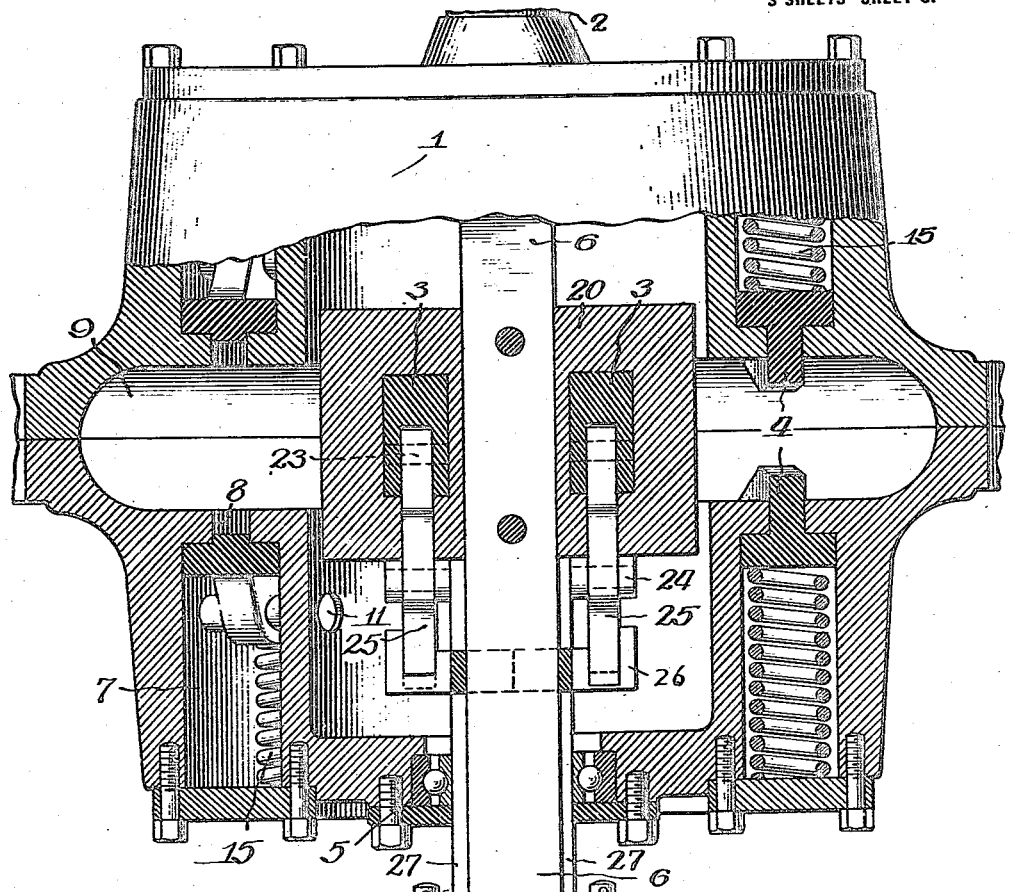
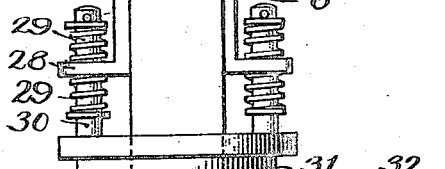
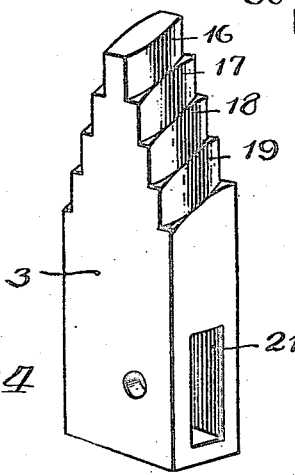

Patented Sept. 19, 1922.

1,429,882

UNITED STATES PATENT OFFICE.

JOHN E. JOHNSON, OF DE KALB, ILLINOIS.

TRANSMISSION FOR AUTOMOBILES.

Application filed December 3, 1920. Serial No. 427,969.

*To all whom it may concern:*

Be it known that I, JOHN E. JOHNSON, citizen of the United States, residing at De Kalb, Illinois, have invented certain new and useful Improvements in a Transmission for Automobiles; and I do hereby declare the following to be a full, clear, and exact description of the invention, such as will enable others skilled in the art to which it appertains to make and use the same.

My invention relates to transmissions for connecting two rotatable parts of any mechanism, and more particularly to transmissions for connecting a continuously rotating shaft with another shaft in such a manner that the speed of the second shaft can be varied considerably. It also aims to provide simple means for adjusting the transmission so that its effectiveness can readily be varied according to the resistance offered to the rotation of the driven shaft, and so that the transmission can also be employed as a clutch for continuously connecting the two shafts. Moreover, I aim to provide these general objects in a novel mechanism constructed without any gearing and operating on a friction-gripped principle which permits parts associated respectively with the two shafts to engage one another during adjustably controlled portions of each revolution of the driving shaft.

While transmissions of this general class may be employed for a large variety of purposes, the transmission of my invention is particularly adapted for use upon automobiles and I am therefore illustrating it in a form suitable for such an embodiment, although I do not wish to be limited to this particular application. Further and more detailed objects of my invention will also appear from the following specification and from the accompanying drawings, in which—

Fig. 3 is a central and longitudinal section taken at right angles to both Fig. 1 and Fig. 2, namely along the line 3—3 of Fig. 1.

Fig. 4 is a perspective view of one of the two drag arms which extend transversely of the driven shaft.

Fig. 10 is a plan view of the parts shown in Fig. 9 viewed in the direction of the arrows in Fig. 9.

In accomplishing the object of my invention according to the illustrated embodiment, I employ the principle of having the driven shaft carry a couple of arms which project transversely outward from this shaft and which are so positioned as to pass between a series of spring-pressed grippers arranged in pairs after the manner of spring clips. These pairs of spring-pressed grippers are mounted in a casing 1 which is fastened to the driving shaft 2 and which therefore continuously rotates with this driving shaft about the common axis of both shafts. Then I provide readily operable means for adjusting the positions of the drag arms 3 so that each of these can present portions of varying thickness between the grippers 4, thereby permitting the duration and effectiveness of the gripping to be varied at the will of the operator.

Figure 5:
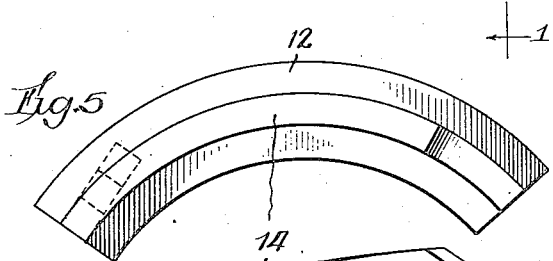
Fig. 5 is a plan view of one of the gripper members carried by the continuously rotating casing of the transmission.
Figure 6:
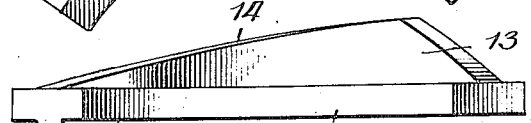
Fig. 6 is an elevation of the same.
Figure 9:
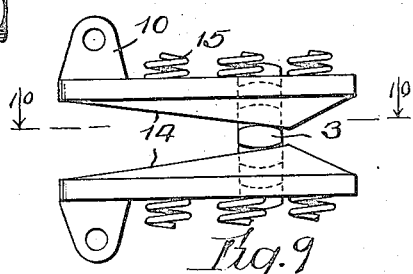
Fig. 9 is a detail view drawn on a reduced scale and showing one pair of grippers and one of the drag arms approaching these grippers.

As a convenient arrangement for this latter purpose, I am here showing the casing 1 as constructed in two halves which in general are counterparts of each other, but in which one half is fastened to the driving shaft 2 while the other half has at its end a bore containing a ball-bearing 5 which permits the driven shaft 6 to rotate freely with respect to the casing 1. Each half of this casing has a series of pockets 7 extending partly around it and opening through slots 8 into a central chamber 9 within the casing, which chamber is in alinement with the path of the drag arms 3 and of the friction portions of the grippers 4. For the grippers, I am showing steel forgings each shaped as shown in Figures 5 and 6 and each having a lug 10 through which it is connected by a pivot pin 11 to the adjacent sides of the pocket 7 which houses both this lug portion and the adjacent base portion 12 of the gripper. Projecting from the base 12 in the opposite direction from the lug 10 on each gripper is a cam 13 which extends through the adjacent slot 8 into the central chamber 9 of the transmission casing. This cam has a face 14 extending oblique to the base 12 so as to present an incline to the nearer side of one of the drag arms 3 when the gripper approaches the latter as shown in Fig. 9. Each of these grippers has at least one spring 15 pressing against the rear of this base, so as to urge the cam portion of the gripper towards the medial plane of the transmission, which plane is also the central plane of the drag arms 3, the gripper being limited as to its movement in that direction by the engagement of the base 12 with the slotted portion 46 of the casing through which the cam 13 projects.

The grippers as thus constructed are arranged in pairs symmetrically disposed with respect to the medial plane of the transmission and the parts are so proportioned that the opposed grippers comprising each pair are normally spaced from each other by a distance greater than the thickness of the extreme tips 16 of the drag arms. Consequently, the grippers will normally clear these drag arms, so that the driving shaft 2 and the casing 1 together with the spring-pressed grippers will revolve without moving the driven shaft 6 which carries the drag arms. However, each of the arms 3 is so mounted that it can be moved longitudinally or laterally outward of the driven shaft, and each of these arms has a series of successively thicker portions 17, 18 and 19 back of its extreme tip, so that any one of these thicker portions can be presented in the path of the grippers by correspondingly adjusting the position of the drag arm with respect to the axis of the transmission. Consequently, if these drag arms are moved sufficiently to present the second portion 17 (which is slightly thicker than the normal minimum distance between the faces 14 of the gripper cams 13) in the path of the grippers, each opposed pair of grippers will frictionally engage this portion 17 on each drag arm for a small part of a revolution of the casing 1 to which the grippers are pivoted. In doing so, the opposed grippers will be forced apart against the pressure of the springs back of them, so that the action is similar to that of a spring clip snapping over an arm interposed in its path. Likewise, if the arms are moved further so as to interpose the next thicker portion 18 in the path of the gripper cams, these will be separated more widely, thereby increasing the amount of friction due to the action of the springs and increasing the rotating effect imparted through the drag arms to the driven shaft by the continuous rotation of the grippers. By suitably adjusting the positions of the drag arms I can therefore vary both the proportionate speed at which the driven shaft is rotated, and the amount of power transmitted. Also, by carrying this adjustment to the point where the grippers are opposite the thickest engaging portion 19 of the drag arms and by having these portions 19 of such a thickness that they will jam between the opposed grippers, I can employ my transmission as a positive clutch, so that my general arrangement not only enables me to provide a transmission which is free from gears but also permits me to eliminate the usual clutch.

Figure 1:
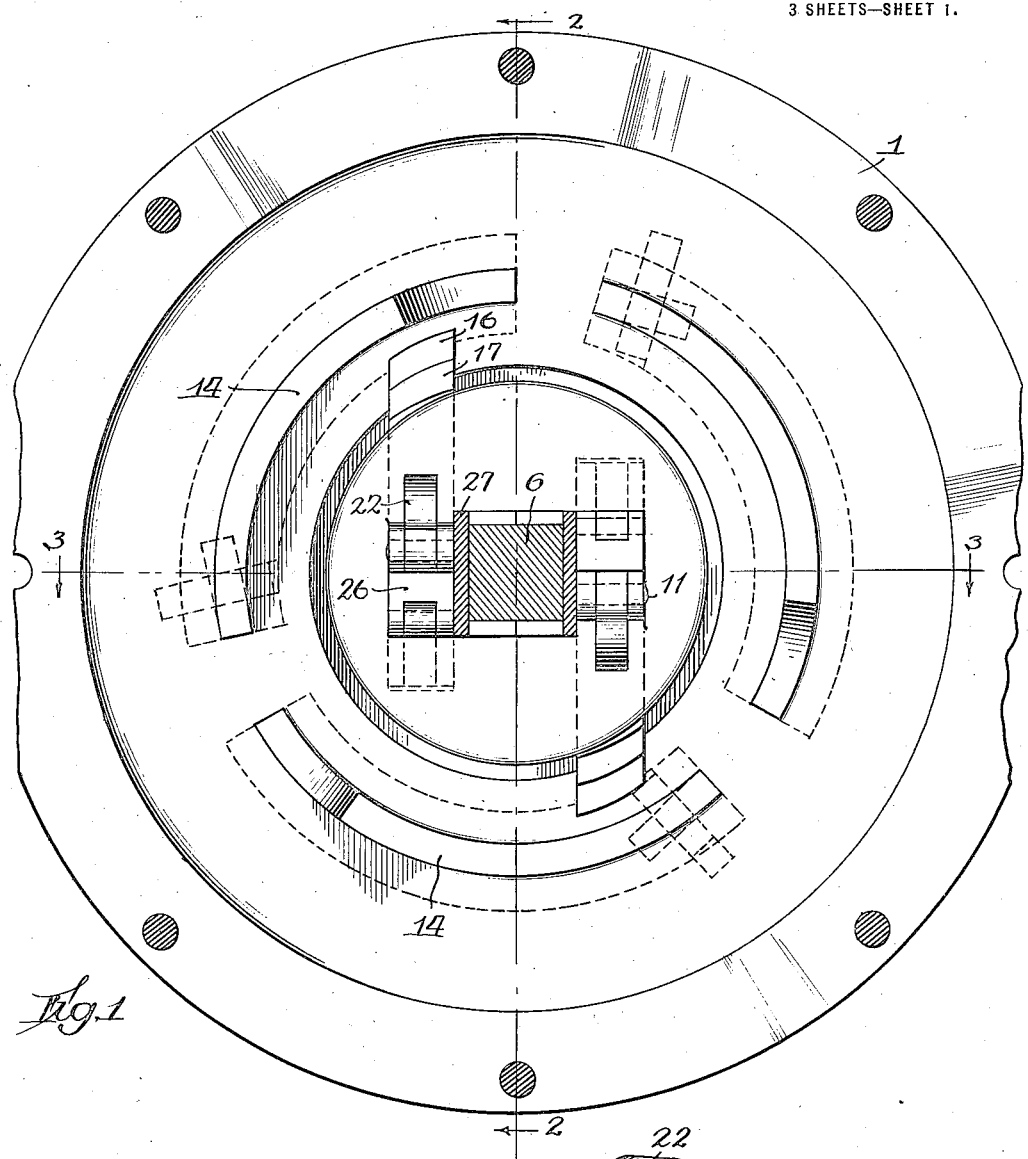
Fig. 1 is a vertical section taken along the correspondingly numbered line of Fig. 2 and showing the interior of the transmission casing together with the arrangement of various parts housed by this casing.
Figures 7, 8:
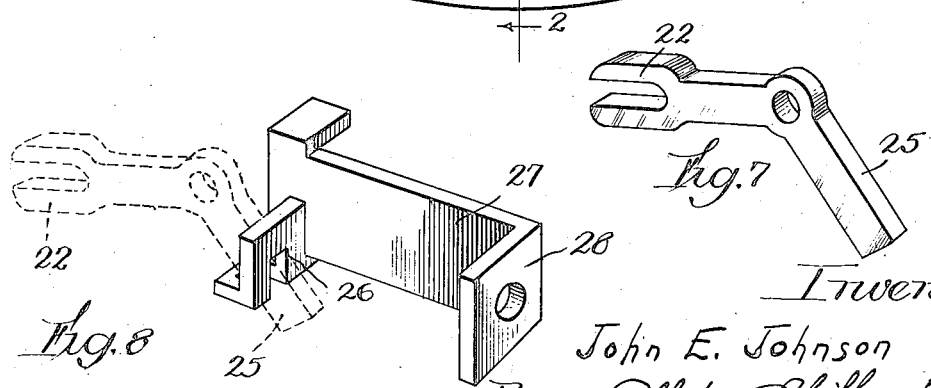
Fig. 7 is a perspective view of one of the levers which effect the adjustment of the two drag arms.
Fig. 8 is a perspective view of one of the two slides used in connection with this adjustment, namely the slide used for rocking the lever of Fig. 7.
Figure 2:
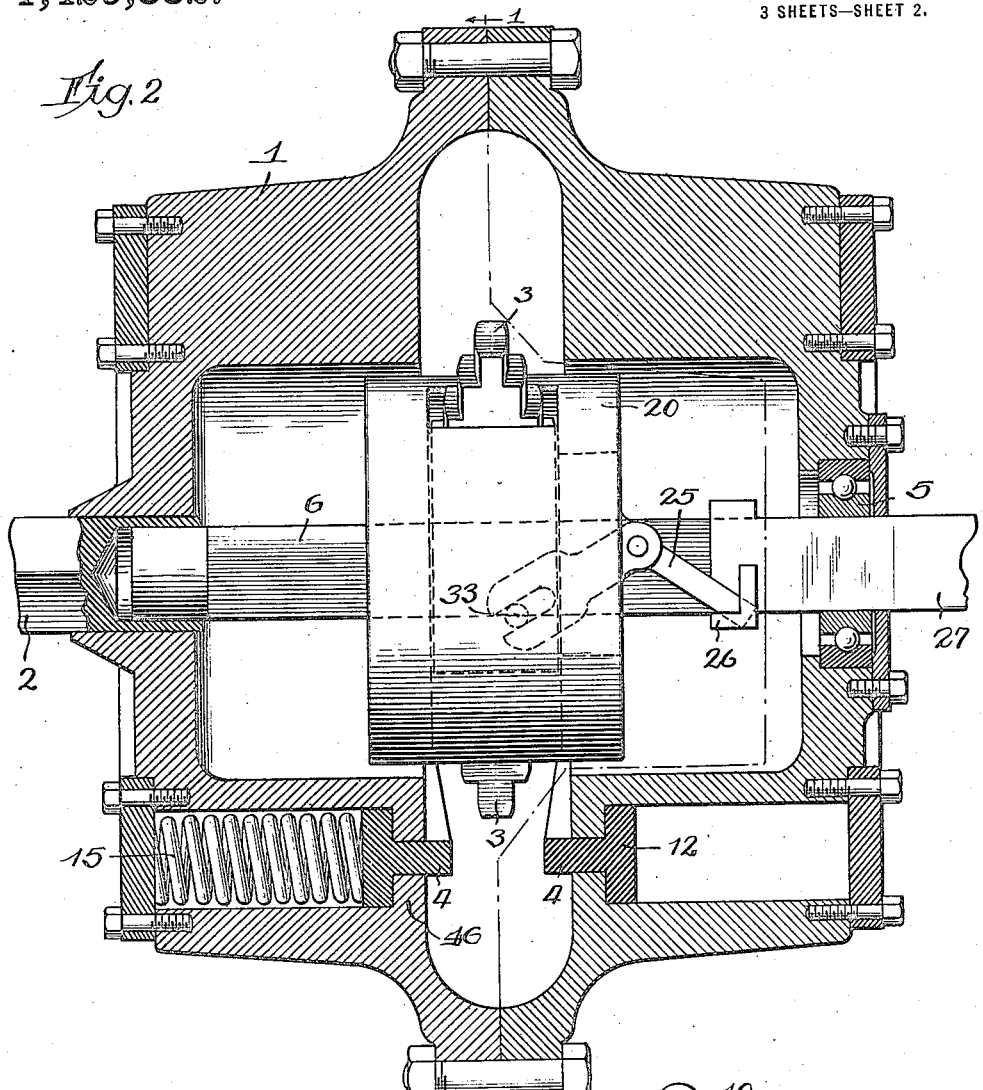
Fig. 2 is a central and longitudinal section through the same, taken along the correspondingly numbered line of Fig. 1.

To effect the needed adjustment of the drag arms, I preferably provide means which can readily be operated while the parts are in rotation. For this purpose, I am here showing a guide member 20 as keyed to the driven shaft 6, this guide member having slots so as to afford slides for the tail portions of the drag arms 3. Each of these drag arms has a transverse bore 21 near its rear end for permitting the entrance of the forked end 22 of a lever (shown in Fig. 7) so that the fork of the lever can engage a pin 23 which extends through the bore 21 and forms a means whereby the lever can move the arm 3 longitudinally. Each of the said levers is pivoted to a lug 24 on the guide member 20 and has an outer lever arm 25 extending slidably through a loop 26 on a slide 27 which slide is shown in perspective in Fig. 8. The two slides as thus arranged are independently movable and extend on opposite sides of the driven shaft 6 through the ball bearing 5 as shown in Fig. 3. Also, each of these slides has at its outer end an ear 28 interposed between a pair of compression springs 29 which both bear against collars on a pin 30. Both pins 30 are fastened to a sleeve 31 which is slidably mounted on the driven shaft 6 and which can be moved longitudinally of that shaft by a control lever 32 having a forked end in engagement with an annular groove in the sleeve 31 after the manner shown in Fig. 3. By moving the control lever 32 through any suitable connections (which are not here illustrated, but which will readily be understood as being arranged within reach of the driver of the vehicle) the collar 31 will therefore move both of the slides 27 longitudinally of the driven shaft 6, thereby rocking the two connecting levers 25 and correspondingly moving the drag arms 3 so as to vary the friction portions of the arms which are presented opposite the cam faces of the grippers.

To avoid a jerky action, I desirably employ grippers symmetrically arranged with respect to the axis of the transmission, but of a number which is not a multiple of the number of drag arms, and preferably use an even number of drag arms and an odd number of pairs of grippers, so that the arms will not be simultaneously engaged but will be subjected to an intermittent frictional gripping. For example, I am here showing the use of two drag arms in combination with three pairs of grippers. While the grippers are engaging an arm this gripping would prevent a sliding of the gripped arm for effecting the desired adjustment, hence I interpose the springs 29 for permitting a movement of the collar 31 to compress either the inwardly or the outwardly positioned springs 29 when the collar is moved. These springs when compressed exert a pressure corresponding to the desired movement of the operating slides 27, and this movement is effected for each drag arm as soon as the latter is released from its momentary friction grip. Consequently, by using a separate lever 25 and slide 27 for each of these drag arms and by interposing the springs 29 in the operative connections, I can readily effect the desired adjustment of these drag arms while the various parts are in motion.

To reduce the wear on the operative parts, I desirably employ drag arms and grippers of hardened steel or steel compositions, and I also desirably fill the chamber 9 with a suitable heavy lubricant.

I also desirably curve the grippers concentrically of the shaft so that each of the cam faces of the grippers can have a long sliding engagement with a drag arm without requiring an unduly bulky construction. By thus using strongly built operative parts and operating my transmission on an intermittent grip and slip principle, I obtain an adjustable speed-reducing transmission without any small gear teeth or other fragible parts, and one which might be employed with equal advantages for other purposes than the driving of automobiles.

I claim as my invention:—

1. In a transmission for connecting a pair of coaxially rotatable members, an arm extending radially of one member, and two spring pressed means carried by the other member and arranged for frictionally engaging the said arm when between the said means while normally permitting the arm to pass between the said means.

2. In a transmission for connecting a pair of coaxial shafts, an arm transverse of one shaft, and a spring clip carried by the other shaft and having its cooperating jaws spaced longitudinally of the shaft and disposed so that the said arm can pass between the jaws and can frictionally engage the jaws while thus passing between them.

3. A transmission as per claim 2, in which the arm has consecutive longitudinal portions of varying effective width, in combination with means for moving the arm transversely of the shaft carrying the same so as to vary the width of the arm portion engaged by the jaws of the clip.

4. A transmission as per claim 2, in which the arm has consecutive longitudinal portions of varying effective width, in combination with means operable while the shafts are rotating for adjusting the position of the arm transversely of the shaft carrying the same, whereby to vary the width of the arm portion engaged by the jaws of the clips.

5. In a transmission for connecting two substantialy coaxial shafts, a drag member extending transversely of one shaft and fast thereon, and gripper means carried by the other shaft and disposed for frictionally engaging opposite sides of the drag member during separated portions of each revolution of the shaft carrying the said gripper means with respect to the shaft carrying the drag member.

6. In a transmission for connecting two substantially coaxial shafts, a drag member extending transversely of one shaft and rotating with the same, and plural spring clips carried by the other shaft and each disposed for successively gripping the drag member from both sides thereof during each revolution of the shaft carrying the said spring clips.

7. In a transmission for connecting two coaxially rotatable members, cooperating grippers carried by one of the members and arranged in pairs with the gripper elements of each pair pivoted for movement towards each other and away from each other, spring means continuously urging the gripper elements of each pair towards each other, and means for limiting the approach of the said gripper elements to each other.

8. In a transmission connecting two coaxially rotatable members, a drag arm carried by one member and extending transversely of the common axis of the said members, means carried by the other member for intermittently frictionally gripping the drag arm from opposite sides thereof, and means for adjusting the effective pressure of such frictional gripping.

9. In a transmission connecting two coaxial rotatable members, a pair of spring-pressed cams rotating with one of the members and presenting oppositely inclined faces, and an arm carried by the other member and moving in a path which adapts it intermittently to be frictionally engaged between the said inclined faces of the cams, 10. A transmission mechanism as per claim 9, in which each of the cams is pivotally mounted, in combination with means for limiting the extent to which the spring pressure causes the cams to approach.

11. In a transmission connecting two coaxial rotatable members, a plurality of pairs of spring-pressed cams carried by one of the members and disposed in annular formation about the axis thereof, each pair comprising two cams having opposed faces symmetrically oblique to the medial plane of the transmission, and a plurality of drag arms projecting from the other member and rotatable substantially in the said plane.

12. A transmission as per claim 2, in which the arm has portions of varying effective width, in combination with means operable while the shafts are rotating for adjusting the position of the arm with respect to the shaft carrying the same, whereby to vary the width of the arm portion engaged by the clip, the said means including a member slidable on the last named shaft and a lever connecting the said member with the arm.

13. In a transmission for connecting two coaxial shafts, a plurality of drag arms carried by one shaft transversely thereof and rotating with this shaft, each arm having a series of portions of successively different thickness, spring-pressed means carried by the other shaft and disposed for frictional engagement with the drag arms, and single means for moving the drag arms to vary the thickness of the latter presented for frictional engagement with the spring-pressed means, the drag arms being separately and yieldingly connected to the said single means.

14. In a transmission mechanism as per claim 13, a guide member fast on the first named shaft and slidably carrying the drag arms, levers pivoted on the guide member and respectively connected at one end to the drag arms for sliding the latter on the guide member, a collar slidable on the said shaft and separate yielding means connecting the collar with the said levers.

15. In a transmission for connecting two coaxially rotatable members, a drag arm transverse of one member and rotatable with the same, and a pair of grips carried by the other member and disposed for clamping the drag arm between them, the said grips being pivotally mounted and presenting oblique faces towards the path of the rotation of the drag arm and having the ends of the said faces nearest to their pivotal mounting spaced by a distance greater than the extreme width of the drag arm.

16. In a transmission for connecting two coaxially rotatable members, a drag arm transverse of one member and rotatable with the same, a casing fast on the other member and having a pair of partitions transverse of its axis of rotation, each partition having arcuate slots concentric with the said axis, and cam means yieldingly projected through the said slots and adapted to frictionally engage the drag arm.

17. A transmission as per claim 16, in which the cam means comprise cams pivoted to the said partitions and springs continuously urging the cams through the adjacent slots.

18. A transmission as per claim 16, in which the cam means comprise cams pivoted to the said partitions and springs continuously urging the cams through the adjacent slots and stop formations on the cams for engaging the partitions to limit the movement of the cams through the slots.

19. A transmission as per claim 15, in which the grips are symmetrically disposed with respect to the path of rotation of the drag arm and are pivoted on axes extending parallel to the medial plane of the said path.

Signed at De Kalb, Illinois, November 27th, 1920.

JOHN E. JOHNSON.